United States Patent [19]

Temple et al.

[11] Patent Number: 4,784,241
[45] Date of Patent: Nov. 15, 1988

[54] INTEGRATED DISC BRAKE AND DRUM RAKE CONSTRUCTION

[75] Inventors: Robert B. Temple; James J. Colpaert, both of Granger, Ind.

[73] Assignee: Allied-Signal Inc., Morristown, N.J.

[21] Appl. No.: 73,923

[22] Filed: Jul. 15, 1987

Related U.S. Application Data

[63] Continuation-in-part of Ser. No. 911,836, Sep. 26, 1986, abandoned.

[51] Int. Cl.[4] .............................................. F16D 63/00
[52] U.S. Cl. .................................. 188/70 R; 188/72.5; 188/73.39; 188/73.45; 188/73.46; 188/73.47; 192/65
[58] Field of Search ................. 188/71.1, 73.45, 73.44, 188/73.47, 73.39, 70 R, 70 B, 72.5; 192/65

[56] References Cited

U.S. PATENT DOCUMENTS

| 3,443,669 | 5/1969 | Jeffries | 188/70 R |
|---|---|---|---|
| 3,557,912 | 1/1971 | MacAfee | 188/70 R |
| 3,712,422 | 1/1973 | Haraikawa et al. | 188/72.5 X |
| 3,773,149 | 11/1973 | Toshida et al. | 188/73.44 X |
| 3,805,925 | 4/1974 | Schoenhenz | 188/73.45 |
| 3,889,785 | 6/1975 | Hori | 188/23.45 |
| 4,109,766 | 8/1978 | Inoue et al. | 188/73.45 X |
| 4,261,443 | 4/1981 | Wright | 188/73.39 |
| 4,465,164 | 8/1984 | Anderson | 188/73.45 X |

FOREIGN PATENT DOCUMENTS

| 2822007 | 11/1978 | Fed. Rep. of Germany | 188/73.34 |
|---|---|---|---|
| 51133 | 4/1980 | Japan | 188/70 R |

Primary Examiner—George E. A. Halvosa
Attorney, Agent, or Firm—Larry J. Palguta; Ken C. Decker

[57] ABSTRACT

The present invention comprises an integrated disc brake (50) and drum brake (120) construction. A support member (12) is supported by a vehicle axle (14) and extends radially outwardly to provide support for a housing (52) of the disc brake (50). The housing (52) is secured by bolts (93 or 94) to the support member (12), the housing (52) having through openings (54) for receiving rod members (75). The rod members (75) each have one end (76) secured to the support member (12) and a second part (90) and the other end has an opening (77) for an internal bore (78) extending therein. The disc brake (50) includes an axially movable yoke (60) attached to guide pins (82) extending into bores (78) of the rods (75) for slidable movement therein. The second part (90) extends radially to provide support for an inner brake pad (20) and may extend axially away from the housing (52) to provide an anchor support (91) for shoulders (132, 142) of drum brake shoes (130, 140). The support member (12) supports a mechanical actuator (121) which may be operated to bias the drum brake shoes (130, 140) into engagement with a drum portion (42) of the brake disc (40) in order to effect a parking brake operation.

23 Claims, 6 Drawing Sheets

INTEGRATED DISC BRAKE AND DRUM RAKE CONSTRUCTION

This is a continuation-in-part of application Ser. No. 911,836, filed 9/26/86, now abandoned.

The invention relates generally to an integrated disc brake and drum brake construction, and particularly to a disc brake having a modular wheel cylinder.

When different braking forces are desired for different models of vehicles, prior art disc brakes require either a new wheel cylinder in order to effect higher or lower braking pressures needed for braking or a new disc brake be tooled in order to provide the different braking pressures. It is highly desirable to provide a disc brake which requires only minimal modification in order to effect different braking characteristics for respective different models of vehicles. Additionally, it is desirable that the disc brake be non-handed, i.e., neither left-handed nor right-handed in design so that the disc brake can be mounted on either side of the car by simply moving the disc brake laterally and attaching one of opposing portions of the disc brake to the associated support member. The support member should have a standard diameter readily accepted by several models of vehicles, while the exact shape of the support member may be altered by simply changing inserts in progressive dies utilized in stamping the support member, all without affecting the maximum diameter of the support member. Thus, it would be possible to provide a drum brake on several different models of vehicles while having maximum flexibility in the design of the support member of the drum brake construction. It would also be highly advantageous to integrate the support member of the disc brake with the support member or backing plate of the drum brake construction, in order to eliminate unnecessary parts and manufacturing steps and to significantly reduce the cost of an integrated disc brake and drum brake construction. The drum brake would be utilized for a parking brake application.

The present invention provides solutions to the above problems by providing a support member which is supported by a vehicle axle and comprises both the backing plate for a drum brake utilized for a parking brake application and the support member for a disc brake which effects braking of the vehicle. The disc brake comprises a torque support member having receiving means, a piston housing having piston means disposed in a housing bore and the piston housing fixed to said support member, a yoke engaging on one side said piston means and on the other side a first brake pad, rod means accepted in said receiving means and having an internal bore, the rod means extending within an opening in said piston housing, and pin means attached at one end to said yoke and at the other end extending for slidable movement within said internal bore, the rod means permitting slidable movement of said yoke and pin means.

One way of carrying out the invention is described in detail below with reference to the drawings which illustrate an embodiment, in which.

Figure 1:
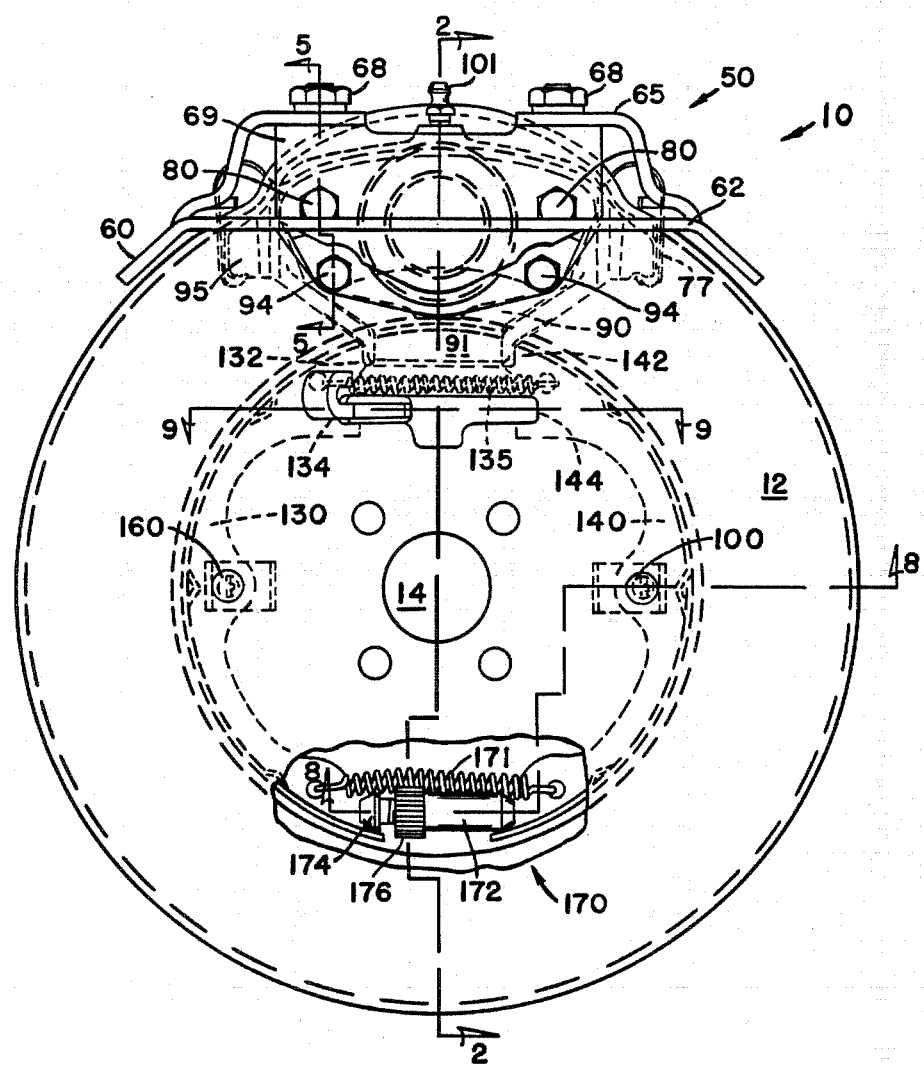
FIG. 1 is an inboard side view of the integrated disc brake and drum brake construction of the present invention.
Figure 2:
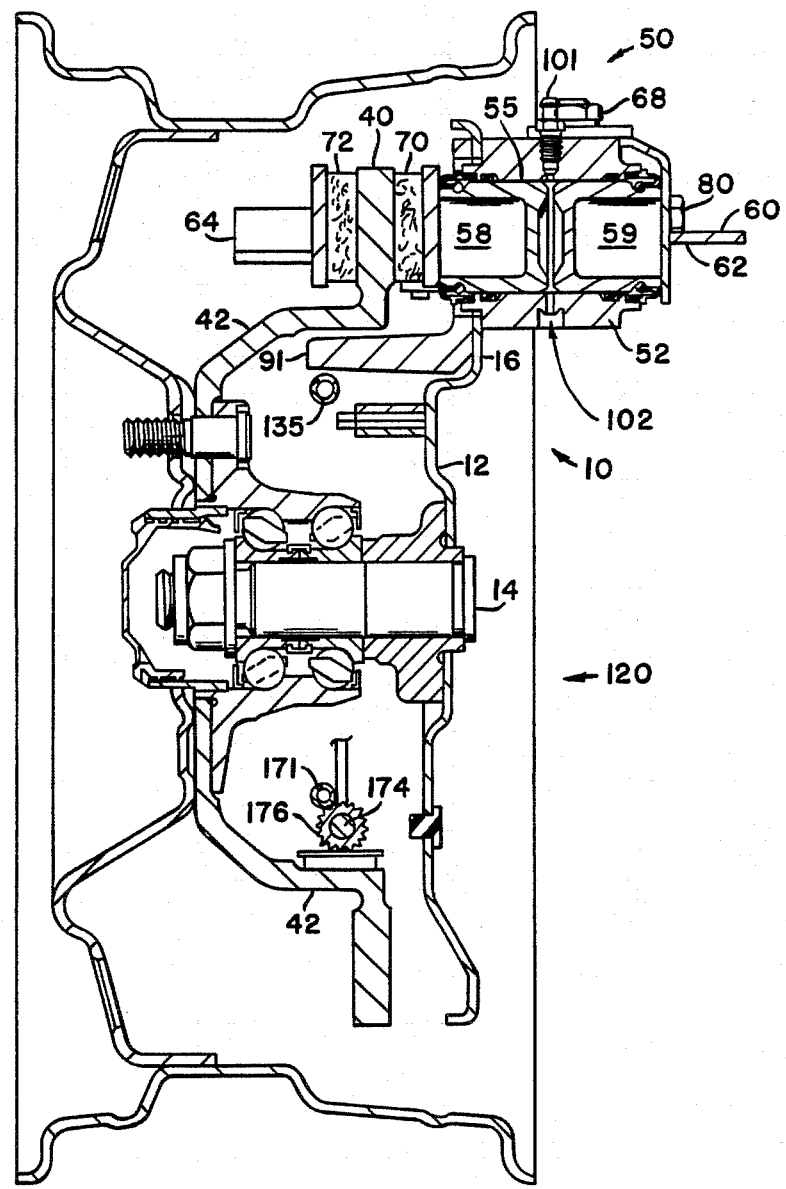
FIG. 2 is a section view taken along view line 2—2 of FIG. 1.
Figure 3:
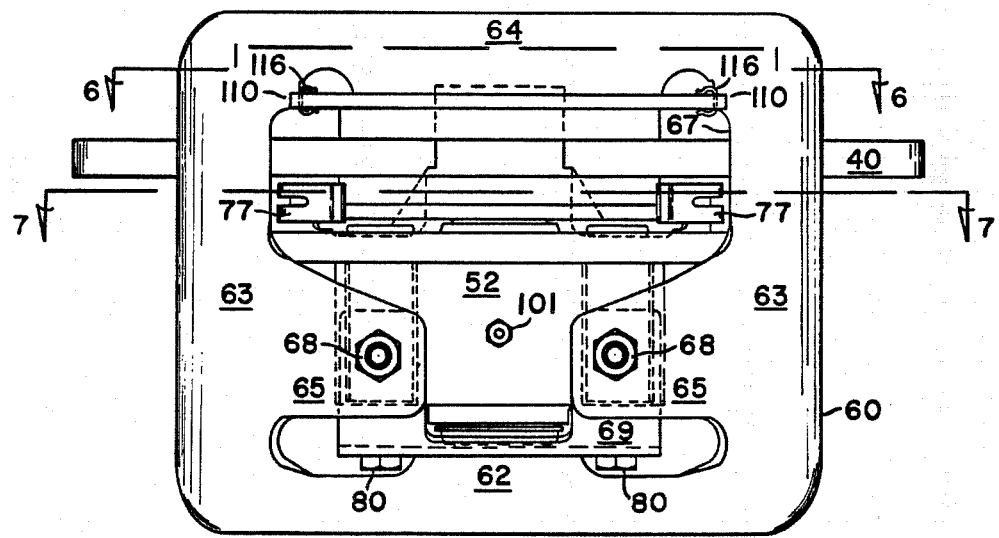
FIG. 3 is a top view of the construction illustrated in FIG. 1.

The integrated disc brake and drum brake construction of the present invention is designated generally by reference numeral 10. Referring to FIGS. 1 and 2, the construction 10 includes a support member 12 supported by a vehicle axle 14 and extending radially outwardly to radially outer portion 16. Support member 12 comprises a backing plate for a drum brake and also a support member for a disc brake. Radiallly outer portion 16 includes a pair of openings 18 and 20 (see FIG. 5). The disc brake is designated generally by reference numeral 50 and includes a piston housing 52 having a pair of through-openings 54 and opposed pairs of openings 56 and 57. Disc brake 50 includes a yoke 60 (see FIG. 3) which includes an inboard portion 62 and an outboard portion 64 connected by circumferential side portions 63. The piston housing 52 includes central bore 55 housing a pair of opposed pistons 58, 59. Piston 58 engages an inner friction or disc brake pad 70 while piston 59 engages yoke inboard portion 62. The yoke 60 includes circumferentially extending portions 65 which extend inwardly to be spaced-apart from one another, and form a portion of the perimeter of a central opening 67. Each circumferentially extending portion 65 provides support for a bolt 68 which secures a yoke plate 69 to yoke 60. Yoke plate 69 extends radially inwardly and has a pair of openings 66 (FIG. 5) each of which receive the head of a bolt 80. Rods 75 have at one end flanged portions 76 which secure together support member second part 90 and support member 12. Each rod 75 is received within an aligned through opening 54 and the other end of each rod member has an opening 79 for an internal bore 78. Bolts 80 secure slidable guide pins 82 to the yoke plate 69, the slidable pins extending within the internal bores 78. Disposed about each slidable guide pin 82 is a sleeve member 83. Bolts 93 are received threadably within openings 57 of piston housing 52 in order to secure the piston housing to the support member 12 and second part 90. Bolt openings 56 receive threaded bolts 94 which secure holder plate 98 to piston housing 52. Holder plate 98 provides securement for an end of the flexible boot 100 which has the boot end trapped between the holder plate and a flange of sleeve 83. Thus, support plate 12 and second part 90 are secured together by both the threaded bolts 93 and rods 75, rods 75 each extending within an associated through opening in the piston housing and slidably receiving the associated guide pins 82 which support yoke 60 of disc brake 50.

Figure 4:
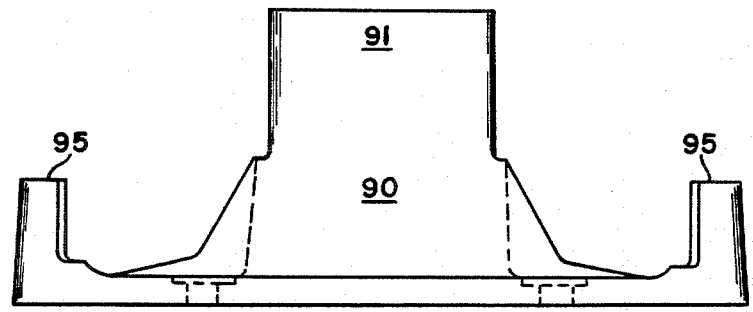
FIG. 4 is a top view of the anchor plate of the present invention.
Figure 6:
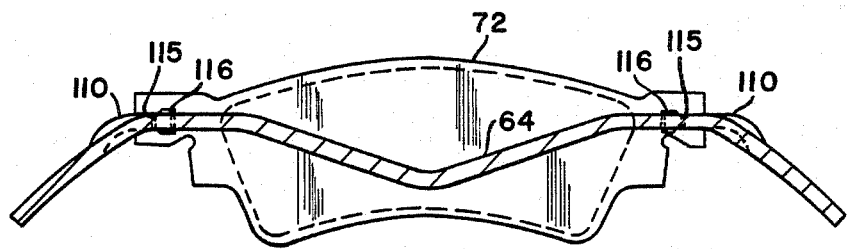
FIG. 6 is a segmented view of the outer disc brake pad.
Figure 7:
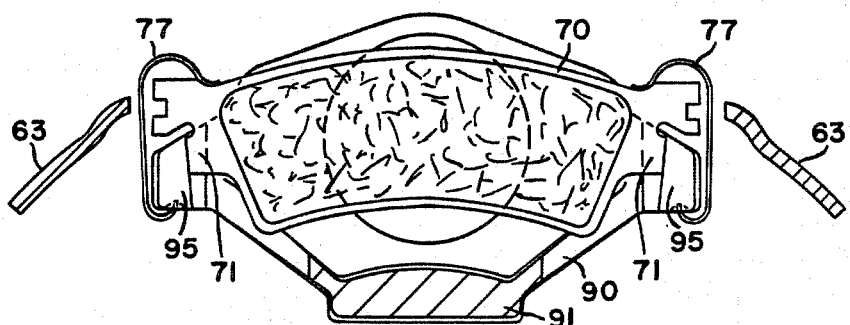
FIG. 7 is a segmented view of the inner disc brake pad.

Hydraulic fluid pressure received from a master cylinder (not shown) is communicated via an inlet 102 (FIG. 2) to bore 55 and displaces pistons 58, 59 axially away from one another, piston 58 biasing inner friction pad 70 directly into engagement with disc 40 and piston 59 displacing inboard yoke portion 62 to bring outboard friction or brake pad 72 into engagement with the opposite face of disc 40. Air bleed for the hydraulic system is provided by a bleed fitting 101. The yoke 60 is slidably supported by means of the bolts 80, guide pins 82, and sleeves 83 received within the internal bores 78 of rods 75 secured to support member 12 and second part 90. FIG. 6 illustrates the radial and circumferential positioning of outer friction pad 72. Yoke 60 extends circumferentially into a pair of opposed support projections 110 which are received within slots 115 of friction pad 72. Slots 115 include anti-rattle springs 116. As shown by FIGS. 4 and 7, second part 90 extends radially outwardly into circumferentially opposed portions 95 which provide anchoring abutments for inner brake pad 70. Brake pad 70 includes abutments 71 which engage radially abutments 95, and the pad is held radially in place by spring members 77.

Figure 8:
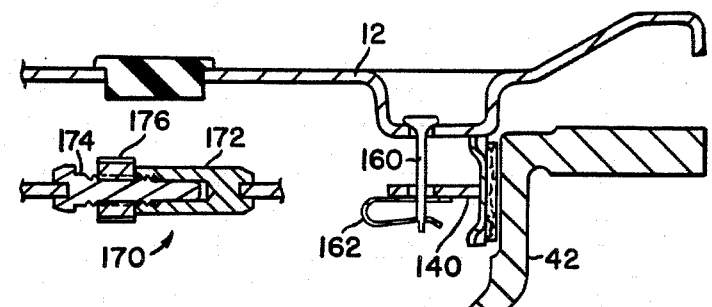
FIG. 8 is taken along view line 8—8 of FIG. 1.
Figure 9:
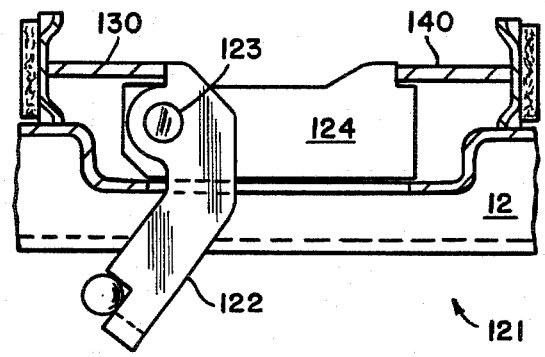
FIG. 9 is taken along view line 9—9 of FIG. 1.

Referring to FIG. 4, second part 90 when viewed from above may include an axial extension 91 which extends within the drum brake 120 (see FIG. 2). Drum brake 120 includes a mechanical actuator 121 comprising a lever arm 122, pivot point 123, and engagement plate 124 (see FIG. 9). Lever 122 abuts drum brake shoe 130 and abutment plate 124 abuts drum brake shoe 140. Brake shoe 130 includes a shoulder 132 and brake shoe 140 includes a shoulder 142 (see FIG. 1) each positioned adjacent the axial extension 91 of second part 90 which forms an anchor support plate for drum brake shoes 130 and 140. Drum brake shoes 130 and 140 biased together by spring 135 are supported by means of the slot openings 134, 144 and pin members 160 which extend through axial openings in the shoe webs (see FIG. 8). FIG. 8 illustrates pin members 160 which are biased by springs 162 mounted in contact with the brake shoe webs. The opposite ends of brake shoes 130 and 140 include an adjustable strut mechanism 170 comprising a spring 171, nut 172, screw 174, and star wheel 176 engaged by the spring 171. The adjustable strut mechanism is conventional and operates in a manner well known to those versed in the art, and will not be explained further. Disc 40 includes an axial or drum portion 42 (FIG. 2) which is circular and provides a rotating drum for drum brake 120. The drum brake pads 130 and 140 are positioned adjacent drum 42 for engagement therewith when biased radially outwardly by the actuator 121. The actuator 122 is connected to a hand brake cable (not shown).

Figure 5:
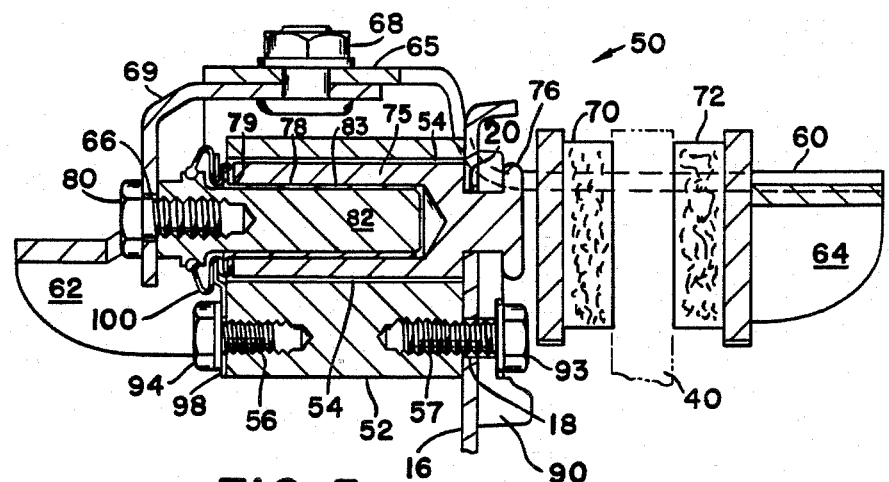
FIG. 5 is taken along view line 5—5 of FIG. 1.

As described above, brake fluid pressure received through inlet 102 biases pistons 58, 59 axially outwardly to bias brake pads 70 and 72 into braking engagement with opposite faces of disc 40. The yoke 60 is axially displaceable relative to piston housing 52 by means of guide pins 82 slidably received within rods 75 which are secured to support member 12 and second part 90, the piston housing also being secured to support member 12 and second part 90 by bolts 93. If it is desired to effect a different braking force for a different vehicle, rather than providing an entirely new disc brake structure, the piston housing of the present invention may simply have a different size bore extruded therein so that a different size piston may be utilized and different braking characteristics achieved. Also, the disc brake of the present invention is non-handed, i.e., neither right-handed nor left-handed. Referring to FIG. 5, if the brake is to be mounted adjacent the opposite wheel of the axle, the housing 52 is mounted to support member 12 and second part 90 (which are reversed) via the bolts 94 and openings 56, while rods 75 would be in reversed positions relative to that shown in FIG. 5 but still secured to member 12 and second part 90 and providing slidable support for pins 82.

The present invention provides a disc brake that is integrated with a drum brake by means of a stamped support member which carries an interchangeable disc brake housing and pistons, the support member including an integrated second part which may provide an anchor support for the drum brake shoes. The drum brake construction 120 is utilized for a parking brake application. When the actuator 121 is operated by the vehicle operator pulling the parking brake lever, the parking brake cable is retracted which causes lever 122 to pivot and bias drum brake shoe 130 radially outwardly and, by reaction, drum brake shoe 140 radially outwardly into engagement with the drum 42. It has been found that several models of vehicles will accept the same size diameter drum brake, and therefore the present invention can be utilized for several different models with only minor changes made in the configuration of support member 12 according to the particular vehicle model. The changes in support member 12 can be accomplished merely by changing the inserts in progressive dies utilized to stamp out the support member, thereby changing its configuration but still retaining the overall common drum brake diameter size applicable to several vehicles. If the disc brake construction of the present invention is desired for use on a front wheel of a vehicle, the axial extension 91 of second part 90 may be eliminated because a drum brake is normally not utilized on front wheels of the vehicle. Thus, the support member and disc brake construction can be utilized in the absence of the drum brake construction. The integrated disc brake and drum brake construction provides an easily manufacturable and low cost construction which includes considerable strength inherent in the construction. The housing 52 is secured by means of the bolts 93 or 94, and the rods 75 provide further positioning of the housing relative to support member 12 and second part 90 so that, when viewing FIG. 1, there are four points which provide a combination of support and positioning for disc brake 50.

Figure 10:
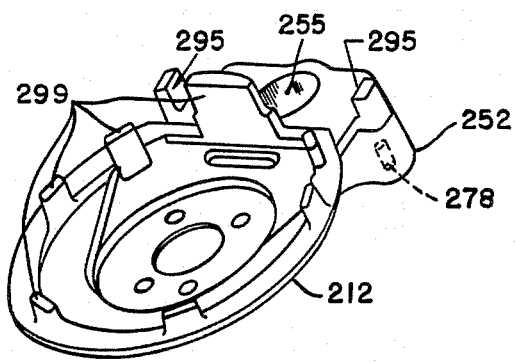
FIG. 10 is an isometric view of an alternative embodiment of a support member utilized for a disc brake.
Figure 11:
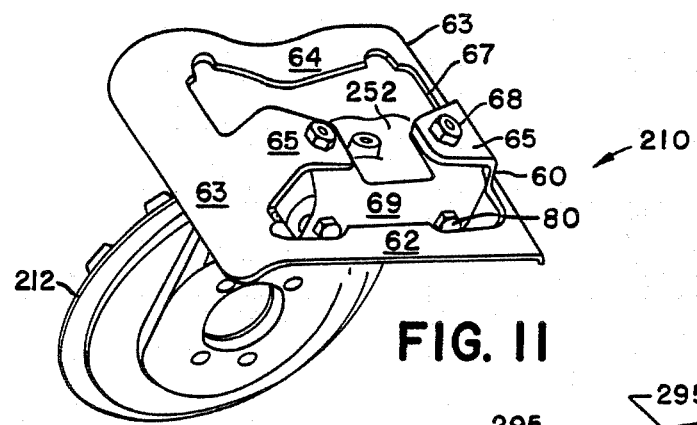
FIG. 11 is an isometric view of the disc brake support member and yoke.
Figure 12:
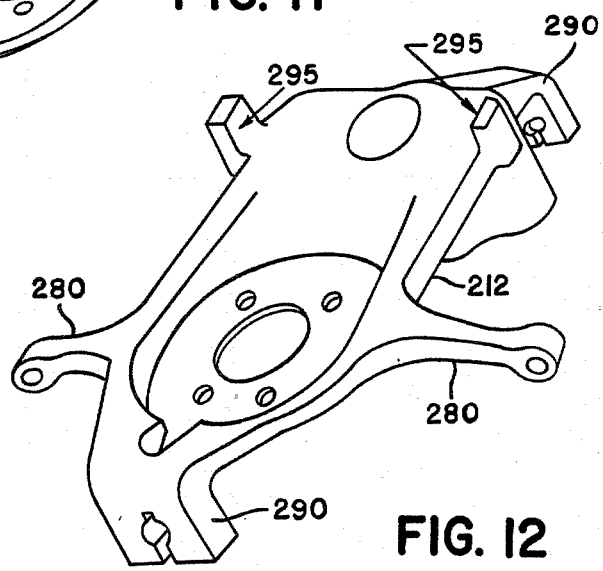
FIG. 12 is an isometric view of the disc brake support member with steering arms and ball joint supports.

FIGS. 10–12 illustrate a further embodiment of the support member 12. In FIG. 10, support member 212 comprises an integral cast member which includes a piston housing 252, opposed portions 295, internal bores 278, central bore 255 and structural elements 299. The disc brake construction 210 is illustrated in FIG. 11 and includes a yoke 60 having circumferentially extending portions 65, a central opening 67, inboard and outboard portions 62, 64, circumferential side portions 63, yoke plate 69 attached by bolts 68 to circumferentially extending portions 65, and bolts 80 which secure the plate 69 to guide pins received slidably in internal bores 278. The yoke 60 is the same yoke described above for disc brake and drum brake construction 10, except that the guide pins are reeived slidably within internal bores 278 without the utilization of sleeve members disposed about the guide pins. Also, internal bores 278 are disposed within housing 252 rather than within rods that extend through the housing. Disc brake construction 210 is a non-handed construction which may be utilized on either side of the vehicle, and provides an integral, cast construction member that comprises the support member, housing, and opposed portions 295 which provide anchoring abutments for the inner brake pad. The advantage of disc brake construction 210 is that several parts are combined into one integral cast member which permits the elimination of parts such as the rods and sleeves utilized previously to secure together the support member and support and to receive the guide pins. FIG. 12 illustrates support member 212 with the addition of integral steering arms 280 and ball joint supports 290.

Various modifications of the above-described embodiment of the invention will be apparent to those skilled in the art. It is to be understood that such modifications can be made without departing from the scope of the invention.

We claim:

1. A disc brake, comprising a torque support member having receiving means, a piston housing having piston means disposed in a housing bore and the piston housing fixed to said support member, a yoke engaging on one side said piston means and on the other side a first brake pad, characterized in that the brake comprises rod means accepted in said receiving means and having an internal bore, the rod means extending within an opening in said piston housing, pin means attached at one end to said yoke and at the other end extending for slidable movement within said internal bore, the rod means permitting slidable movement of the yoke and pin means, the opening in said piston housing extending therethrough and the piston housing abutting a radial surface of said support member, the rod means including an enlarged head for securing said rod means to said support member, the pin means including thereabout a sleeve member received between the pin means and adjacent surface of the internal bore of the rod means, and the piston housing including aligned openings on opposite sides thereof, one aligned opening receiving a bolt which secures said piston housing to the support member and the other aligned opening receiving means for securing a plate member to the housing.

2. The disc brake in accordance with claim 1, wherein the plate member secured to the piston housing provides retaining means for a flexible boot member extending between said rod means and said pin means.

3. The disc brake in accordance with claim 2, wherein the yoke includes a pair of oppositely disposed and circumferentially extending portions spaced-apart from one another at a radially outermost location of said disc brake, the circumferentially extending portions each including means for attaching to the yoke a yoke plate which extends radially inwardly to an attachment with the pin means.

4. The disc brake in accordance with claim 3, wherein the support member comprises a two-piece support member secured together by said rod means.

5. The disc brake in accordance with claim 4, wherein a second part of the support member extends radially outwardly into a central opening of said yoke.

6. The disc brake in accordance with claim 4, wherein a second part of the support member extends into a central opening of the yoke and provides radial and circumferential support for a second brake pad.

7. The disc brake in accordance with claim 6, wherein the second brake pad has a pair of oppositely disposed abutments received by corresponding portions of said second part, the second brake pad being maintained in engagement with the portions by means of a spring member at each portion.

8. The disc brake in accordance with claim 7, wherein the yoke comprises inboard and outboard portions, the outboard portion containing a connecting section having opposed end portions providing support for said first brake pad.

9. The disc brake in accordance with claim 4, wherein a second part of the support member extends axially to provide an anchor plate for brake shoes of a drum brake.

10. The disc brake in accordance with claim 9, wherein the support member provides support for actuator means of said drum brake, the actuator means operable to effect separation of said brake shoes.

11. A disc brake, comprising a torque support member having receiving means, a piston housing having piston means disposed in a housing bore and the piston housing fixed to said support member, a yoke engaging on one side said piston means and on the other side a first brake pad, characterized in that the brake comprises rod means accepted in said receiving means and having an internal bore, the rod means extending within an opening in said piston housing, pin means attached at one end to said yoke and at the other end extending for slidable movement within said internal bore, the rod means permitting slidable movement of the yoke and pin means, the opening in said piston housing extending therethrough and the piston housing abutting a surface of said support member, the rod means secured to said support member, the pin means including thereabout a sleeve member received between the pin means and adjacent surface of the internal bore of the rod means, and the piston housing including aligned openings on opposte sides thereof, one aligned opening receiving means for securing said piston housing to the support member and the other aligned opening receiving means for securing flexible seal retaining means to the housing.

12. A support member connected with a vehicular axle and providing support for a disc brake, said support member extending radially outwardly and having openings therein, the disc brake having a piston housing fixed to said support member by securement means extending through associated openings in said support member, characterized in that the piston housing has at least one through opening receiving therein rod means, the rod means secured at one end to said support member and the other end having a bore extending therein, the disc brake comprising an axially movable yoke member having pin means affixed thereto and extending into said bore for slidable movement relative to said rod means, the support member including a second part, the openings in the support member including respective aligned openings in said second part and receiving therein the securement means, the second part fixed securely to the support member by means of the rod means and securement means, and the second part of the support member extending axially to provide an anchor support for brake shoes of a drum brake disposed about said axle, the brake shoes positioned for engagement with an axially extending circular portion of a disc of said disc brake.

13. The support member in accordance with claim 12, wherein the support member provides support and positioning for an actuator mechanism which is operable to displace said brake shoes radially outwardly into engagement with the axial portion of the disc.

14. The support member in accordance with claim 13, wherein the support member includes apertures which receive respective pin members connected with webs of respective drum brake shoes.

15. The support member in accordance with claim 14, wherein said drum brake shoes are secured together at one end by means of an adjustable strut means.

16. A disc brake, comprising a torque support member having receiving means, a piston housing having piston means disposed in a housing bore and the piston housing fixed to said support member, a yoke engaging on one side said piston means and on the other side a first brake pad, characterized in that the brake comprises rod means accepted by said receiving means and having an internal bore, the rod means connected with an anchor support which extends axially to provide anchoring support for brake shoes of a drum brake, the brake shoes positioned for engagement with an axially extending circular portion of a disc of said disc brake, and load bearing pin means attached at one end to said yoke and at the other end extending for slidable movement within said internal bore, the rod means permitting slidable movement of said yoke and pin means, and the pin means transmitting braking torque to the rod means and support member.

17. The disc brake in accordance with claim 16, wherein the opening in said piston housing extends therethrough and the piston housing abuts a radial surface of said support member.

18. The disc brake in accordance with claim 17, wherein the rod means includes means for securing said rod means to said support member.

19. The disc brake in accordance with claim 18, wherein the pin means includes thereabout a sleeve member received between the pin means and adjacent surface of the internal bore or the rod means.

20. The support member in accordance with claim 16, wherein the piston menas comprises a pair of pistons, one piston engaging an inboard friction pad and the other piston engaging the yoke across the entire diameter of the other piston.

21. A support member connected with a vehicular axle and providing support for a disc brake, said support member extending radially outwardly and having openings therein, the disc brake having a piston housing fixed against axial and radial movement to said support member by securement means extending through associated openings in said support member, characterized in that the piston housing has at least one through opening receiving therein rod means, the rod means secured at one end to said support member and the other end having a bore extending therein, and the disc brake comprising an axially movable yoke member having load bearing pin means affixed thereto and extending into said bore for slidable movement relative to said rod means, braking torque transmitted through the pin means to the rod means, housing, and support member.

22. The support member in accordance with claim 21, wherein the support member includes a second part, the openings in the support member including respective aligned openings in the second part and receiving therein the securement means, and the second part fixedly securely to the support member by means of the rod means and securement means.

23. The support member in accordance with claim 21, wherein the piston means comprises a pair of pistons, one piston engaging an inboard friction pad and the other piston engaging the yoke across the entire diameter of the other piston.

* * * * *